July 8, 1969  E. C. LUNDAHL  3,454,171

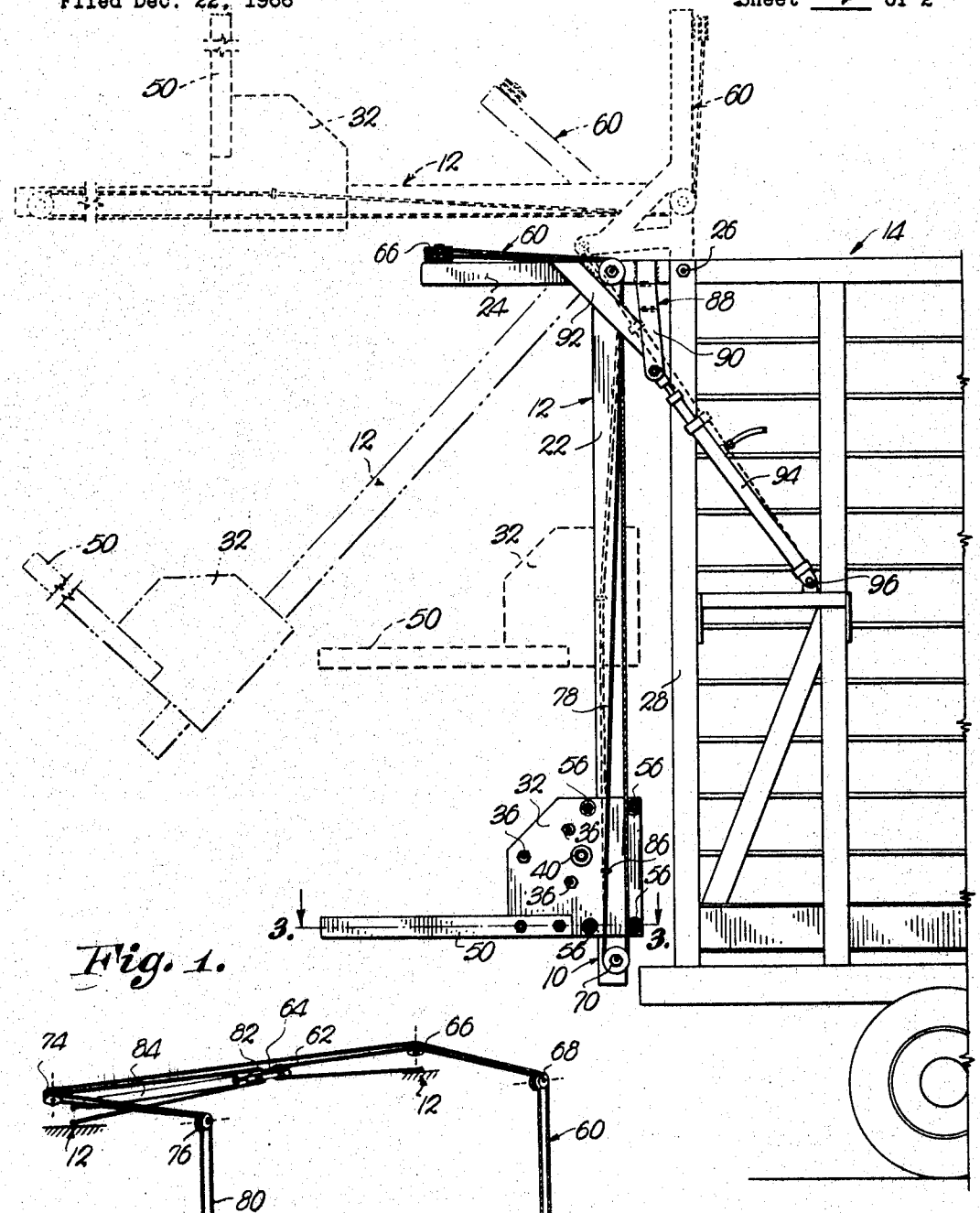

MATERIAL UNLOADER

Filed Dec. 22, 1966  Sheet 2 of 2

INVENTOR
Ezra Cordell Lundahl

BY Hovey Schmidt, Johnson & Hovey
ATTORNEYS

United States Patent Office 3,454,171
Patented July 8, 1969

3,454,171
MATERIAL UNLOADER
Ezra Cordell Lundahl, Providence, Utah, assignor to Hesston Corporation, Inc., Hesston, Kans., a corporation of Kansas
Filed Dec. 22, 1966, Ser. No. 603,881
Int. Cl. B65g 31/04; A01c 17/00
U.S. Cl. 214—17                                7 Claims

ABSTRACT OF THE DISCLOSURE

A frame structure pivotally coupled at the upper end of a material discharge outlet of a material container for swinging about a horizontal axis toward and away from the outlet by hydraulic cylinders. A powered rotor with radiating fingers and an associated drum are carried on spaced, parallel axes by a carriage movable along the frame structure by a system of pulleys and cables for distributing material emanating from the outlet.

---

This invention relates to material handling apparatus and, more particularly, to a distributor for material being pushed through a discharge outlet of a material container.

It is often desirable to store hay and similar livestock feeding material in stacks or ricks after harvesting and until required for feeding purposes. The material may be readily loaded into wagons or similar containers by power forks, loaders or the like. However, the unloading of quantities of feed material such as cured hay or the like often presents a problem if the distribution of the material is to be carried out as desired by the operator. In feeding operations wherein animals are fed hay or the like by spreading the hay onto the ground during cold weather months, it may be particularly important that the material be uniformly distributed or particular conditions may require that the feed be dropped in bunches.

Heretofore, it has often been necessary for the farmer or livestock handler to manually distribute the feed by use of a pitchfork. This manual effort requires a workman other than the driver of the vehicle, is time-consuming, and increases the overall cost and, therefore, the inefficiency of the feeding operation.

Mechanical unloading of feed-bearing vehicles has been attempted by means of shiftable pusher endgates which advance the load by increments toward the vehicle outlet. The material tends to cling together, however, and heretofore available equipment has not given the operator the control over the distribution of the material which is needed.

Accordingly, it is the primary object of this invention to provide apparatus for distributing material in a manner which may be readily controlled by the equipment operator.

In carrying out the foregoing object, it is another important object of this invention to provide apparatus which may be easily operated by the vehicle driver through a range of movements in a plurality of directions for accommodating material to uniformly remove the latter from a load of bulk material throughout the entire unloading operation.

It is yet another object of the instant invention to provide an unloader having self-cleaning characteristics to enhance the uniformity of the unloading operation.

It is still a further object of this invention to provide a novel rotor for a material distributor wherein the rotor cleaning drum is powered for movement relative to the rotor, thereby minimizing the expense of constructing and maintaining the unloader.

Still another important object of this invention is to provide material distributing apparatus which is swingable to a standby position to permit the discharge of a relatively large quantity of material in one location if desired.

Other important objects of the instant invention reside in the provision of a swingable discharge assembly capable of yielding under the influence of frozen material or foreign matter, a cable and pulley arrangement which automatically holds the discharge rotor in a selected position, and the mounting of the finger cleaning drum on interior rollers to obtain free rotation and to avoid clogging of the rollers by the material handled by the unloader.

These and other important objects of the invention will be further explained or will become apparent from the following specification and claims.

In the drawings:

FIGURE 1 is a fragmentary, side elevational view of the distributing apparatus embodying the principles of this invention shown in place on a vehicle, intermediate positions of components appearing in phantom;

FIG. 6 is a perspective view on a reduced scale illustrating the system of pulleys and cables for reciprocating the rotor along its track, the rotor appearing in broken lines.

Figure 3:
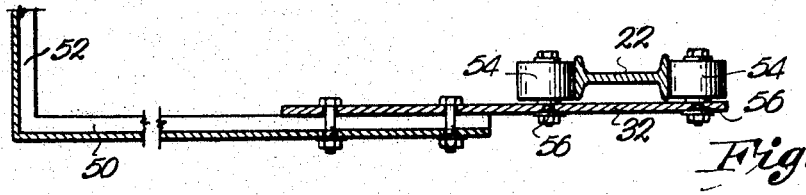
FIG. 3 is a cross-sectional view taken along line 3—3 of FIG. 1.

A material distributor embodying the principles of this invention is broadly designated by the numeral 10 in the drawings and comprises a support structure 12 adapted to be pivotally secured to one end of a material container which may be a vehicle 14. A rotor 16 movably carried by structure 12 is operably coupled with power means broadly designated 18 for reciprocating rotor 16 across the discharge outlet 20 of vehicle 14. Structure 12 has a pair of T-shaped sides comprised of a vertically extending member 22 which is rigidly secured to a horizontally extending member 24. Each member 24 is pivoted at one end as at 26 to a verticle end member 28 of vehicle 14. The outermost ends of the members 24 are connected by a cross member 30 as illustrated in FIG. 2.

Rotor 16 includes a plate 32 for each member 22 respectively. Three rollers 34 are mounted for rotation on the inner surface of each plate 32 on parallel shafts 36 which are secured to the corresponding plates 32. A cylindrical drum 38 which spans the distance between plates 32 is carried by the rollers 34 which engage the inner surface of drum 38 to support the latter for rotation on an axis extending transversely across support structure 12. Rotor 16 also includes a shaft 40 extending in spaced parallelism to the longitudinal axis of drum 38 and journalled in the respective plates 32.

Figure 2:
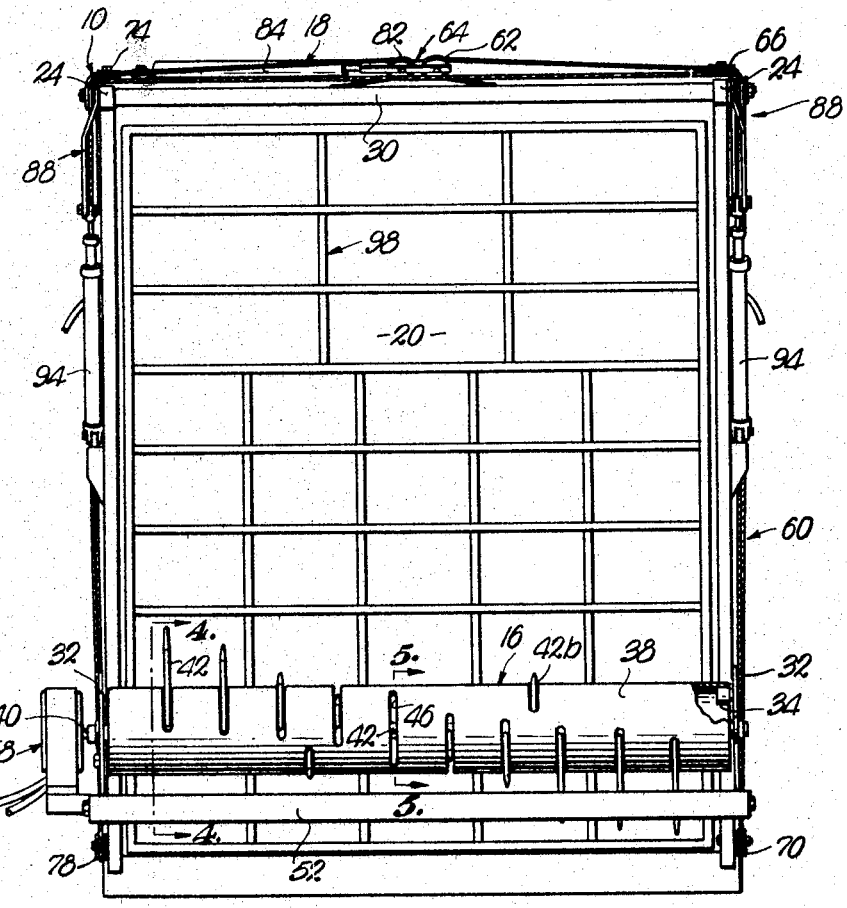
FIG. 2 is a rear elevational view of the apparatus of FIG. 1, parts being broken away to reveal details of construction.
Figure 4:
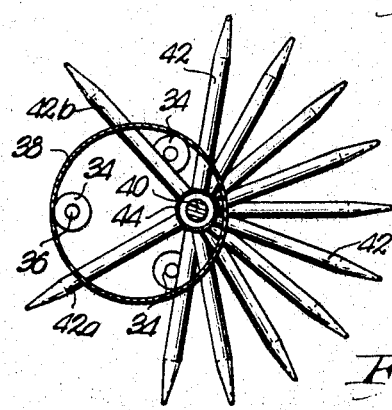
FIG. 4 is an enlarged, cross-sectional view taken along line 4—4 of FIG. 2.
Figure 5:
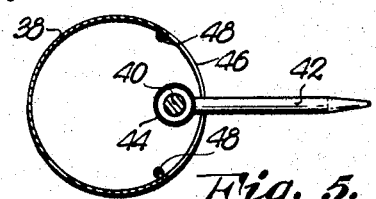
FIG. 5 is an enlarged, cross-sectional view taken along line 5—5 of FIG. 2.

A plurality of radially disposed fingers 42 are mounted on shaft 40 in a spiral configuration as illustrated in FIGS. 2 and 4. In the embodiment illustrated, ten of the fingers 42 are disposed at spaced intervals longitudinally and circumferentially of shaft 40 to provide a spiral extending from end-to-end of rotor 16 and around substantially 180° of the circumference of the latter. Two fingers designated 42a and 42b in FIG. 4 are positioned at circumferentially spaced intervals within the remaining 180° of the circumference of shaft 40. As illustrated, shaft 40 may include an outer sleeve 44 which is secured to the inner shaft by any suitable means such as welded collars or the like.

Shaft 40 is located within drum 38 and an elongated, circumferentially extending slot 46 is provided for each finger 42 in drum 38 to permit the pointed finger 42 to extend outwardly from drum 38 as illustrated in the drawings. The length of the slots 46 is chosen to permit the movement of the fingers with respect to the drum as each rotates about separate, but parallel, axes.

A roller 48 for each end of each slot 46 is disposed to be engaged by the corresponding finger 42 so that the rotation of shaft 40 causes corresponding rotation of drum 38. Manifestly, shaft 40 may be rotated in either direction, whereupon the fingers 42 will move into engagement with either of the rollers 48, depending upon the direction of rotation. Whereas the spirally disposed fingers 42 are in position to engage substantially 180° of the circumference of drum 38 for powering the latter, fingers 42a and 42b are in position to equalize the power imparted to drum 38 throughout the remaining 180° of the circumference of the latter, thereby precluding any twisting or bending of drum 38.

As may be observed best in FIG. 4, the location of the respective axes of rotation of drum 38 and shaft 40 result in the fingers 42 extending a substantial distance outwardly from drum 38 when on one side of the path of rotation of the fingers, whereas the latter are well retracted within drum 38 at the opposite side of the path of rotation.

A pair of rearwardly extending brace members 50 are each secured to respective plates 32 and are interconnected by a crossbar 52 extending parallel to shaft 40 for imparting structural rigidity to rotor 16. The latter is carried for reciprocation on structure 12 by pairs of aligned rollers 54 on either side of members 22. The rollers 54 are mounted for rotation on bolts 56 which are secured to the corresponding plate 32. Thus, the members 22 provide track means along which rotor 16 on rollers 54 may be reciprocated across the vehicle outlet opening 20 as will be hereinafter described.

A prime mover 58 which may be in the nature of a hydraulic motor and associated speed reducer is carried on rotor 16 outwardly from one plate 32 and is operably coupled with shaft 40 for rotating the latter. Prime mover 58 may be operated in either direction for rotating fingers 42 and drum 38 in corresponding directions.

Power means 18 includes an elongated, continuous cable 60 which is secured to structure 12 and rotor 16 as best shown in the schematic illustration of FIG. 6, considered with FIGS. 1 and 2. Thus, one end of cable 60 is secured to cross member 30 and is trained around one pulley 62 of a movable, dual pulley assembly 64. The cable then passes around a dual fixed pulley 66 carried at the outermost end of one of the members 24 from whence it proceeds forwardly to a fixed dual pulley 68 carried at the uppermost end of upright member 22. From pulley 68, the cable extends downwardly around a fixed pulley 70 carried by the lowermost end of the corresponding member 22 and merges into a stretch 72 which proceeds upwardly around pulleys 68 and 66, respectively, and across to another fixed dual pulley 74 carried at the outermost end of the other member 24. From pulley 74, the cable then proceeds forwardly to a fixed dual pulley 76 mounted at the uppermost end of the other upright member 22, downwardly to a fixed pulley 78 carried at the lowermost end of the corresponding member 22 and merges into a stretch 80 extending upwardly around pulleys 76 and 74. The cable is then passed around the second pulley 82 of assembly 64, whereupon the other end of cable 60 is secured to cross member 30 of structure 12.

The assembly 64 is mounted for movement on one end of the piston of a fluid piston and cylinder assembly 84 which is, in turn, pivotally secured to cross member 30 as illustrated in FIG. 2. The plates 32 at either end of rotor 16 are securely fastened as at 86 (FIG. 1) to stretches 72 and 80 respectively of cable 60. It may, therefore, be seen that extension or retraction of the piston of assembly 84 moves the pulley assembly 64 in directions to cause corresponding movement of rotor 16 up or down along its reciprocal path of travel defined by the parallel members 22 of structure 12.

Bracket means broadly designated 88 and including arms 90 extending generally perpendicular from members 24 are secured to the latter intermediate the point 26 of pivotal connection between structure 12 and vehicle 14. Diagonal braces 92 are provided for stabilizing the arms 90. A fluid piston and cylinder assembly 94 is pivotally coupled as at 96 to a point on vehicle 14 intermediate the top and bottom of the latter and in spaced relationship from structure 12 as illustrated best in FIG. 1. The extensible piston of assembly 94 is, in turn, pivotally coupled with the lowermost end of arm 90, it being understood that there is a bracket 88 and an assembly 94 provided for each side of vehicle 14. The brackets 88 thereby provide crank arms to cause the swinging of structure 12 about pivot points 26 as assemblies 94 are operated. If desired, the structure 12 may be swung to the positions shown in phantom in FIG. 1. Throughout such swinging movement, power means 18 may be operated to move rotor 16 to any position along its reciprocable path of travel.

In operation, vehicle 14 on which distributor 10 is installed, is of the type which includes a movable endgate 98 which is conventionally positioned initially at the forward end of the vehicle for pushing the contents toward the rear of the vehicle between the vertical sidewalls thereof and through outlet 20. Vehicles of this type are quite conventional and include suitable power means for shifting endgate 98 longitudinally of vehicle 14 along a reciprocable path of travel.

Vehicle 14 is initially filled with a quantity of bulk material to be distributed. It is contemplated that distributor 10 may have primary application for effecting the uniform distribution of livestock feed in which case the bulk material may very well be hay or the like. Rotor 16 and its associated carriage may be disposed substantially midway between its extreme limits of travel along member 22 with the latter in its vertical position as illustrated in full lines in FIG. 1. Thus, rotor 16 is initially in position to assist in closing outlet 20 during the loading and transporting operation. The bulk material within vehicle 14 is ordinarily of a nature such that no additional closure or rear endgate is needed.

Upon arriving at the point of distribution, the distributor 10 is placed in operation for digging and uniformly distributing the bulk material from vehicle 14 to permit the material to gravitate to the ground. Thus, assembly 84 may be operated by suitable controls (not shown) to move rotor 16 to substantially the uppermost extreme position thereof. Prime mover 58 is thereupon placed in operation by controls available to the vehicle operator to impart rotation to shaft 40. Such rotation moves the fingers 42 into engagement with the material in vehicle 14 to pull portions of the material from the load. Manifestly, shaft 40 may be operated in either direction. In one instance, the material will be pulled over rotor 16 for subsequent gravitation to the ground. The spacing of crossbar 52 rearwardly from drum 38 provides for unobstructed passage of the material therebetween. On the other hand, should shaft 40 be rotated in the opposite direction, the material is pulled from the load for passage beneath rotor 16 and subsequent gravitation to the ground.

As the fingers 42 move into engagement with the load they are in their most advanced positions with respect to the outer surface of drum 38. Continued rotation of the fingers 42 produces the withdrawal of the fingers with respect to the outer surface of drum 38 by virtue of the spacing between the respective axes of rotation as hereinabove explained. Thus, such material as is engaged by the fingers 42, when traveling in proximity to the load, is forced off the outer pointed ends of the fingers as the latter are rotated to the side of drum 38 remote from the load.

Not to be overlooked is the fact that the spiral dispositions of the fingers 42 longitudinally of rotor 16 results in sequential maximum engagement of the respective fingers longitudinally along rotor 16 as the latter is rotated by prime mover 58. This results in a uniform distribution of the maximum forces to shaft 40 to obviate structural damage to the latter. Further, the circumferentially spaced fingers 42a and 42b equalize the load on drum 38 as the latter is rotated at the same speed as shaft 40 by engagement of the fingers 42 against rollers 48.

The vehicle operator effects the shifting of rotor 16 across outlet 20 by controlling the operation of assembly 84 as the vehicle moves along the ground. This results in the pulling of the material from the load in a uniform manner. The vehicle operator simultaneously causes the endgate 98 to be operated in a manner to push the load rearwardly as may be required so that the rotor 16 may engage the rearmost portion of the load for uniformly withdrawing the material for distribution behind vehicle 14.

It should be pointed out that the assemblies 94 are of the displacement type, whereby the distributor 10 may pivot through a vertical arc about pivot points 26 under the influence of the material which is advanced by endgate 98. Thus, should frozen hay, foreign material, or too rapid advancement of endgate 98 present material to rotor 16 of a nature which cannot be adequately accommodated by the latter, the member 22 may swing outwardly from the rear of vehicle 14 as illustrated in dot-dash lines in FIG. 1. This prevents damage to the components of distributor 10 which might otherwise occur.

The vehicle operator continues reciprocation of rotor 16 on its carriage along members 22 and may pass rotor 16 across outlet 20 a number of times during the unloading operation. Further, rotor 16 may be halted at any predetermined position while prime mover 58 continues rotation of rotor 16 for removing the material from the vehicle. The cable and pulley arrangement illustrated in FIG. 6 and described hereinabove, insures that any forces resulting from the rotation of rotor 16 in either direction which would have a tendency to force rotor 16 up or down along its path of travel, are resisted by equal and opposite forces acting through the cables to prevent any movement of rotor 16 until assembly 84 is operated.

Assemblies 94 are not only operable to swing rotor 16 rearwardly for accommodating such projections of the load outwardly from the outlet 20 of vehicle 14 as may occur during the unloading operation, but it is also possible to swing the distributor 10 to the position illustrated by dashed lines in FIG. 1 wherein the members 22 extend substantially horizontally from the upper, rearmost end of vehicle 14. It is also possible, if desired, to swing the distributor 10 to a further position wherein the members 22 are disposed upwardly at an angle from the horizontal. This permits selective unloading of the contents of vehicle 14 at one location as may be desired for filling an animal self-feeder bunk or the like.

Not to be overlooked is the fact that the mounting of the rotor drum 38 on rollers 34 which are disposed within the drum 38, shields the rollers 34 against inadvertent contact with the material which would otherwise have a tendency to clog the rollers and prevent uniform and unobstructed operation of the distributor. Further, it should be noted that the construction of the components of distributor 10 provide for the disposition of rotor 16 parallel with the floor of vehicle 14 at all times throughout its reciprocable path of travel along the members 22. The latter maintain rotor 16 parallel with outlet 20 at all times, all of which results in squareness at the rear end of the load, thereby contributing to uniform incremental distribution of the material.

Having thus described the invention, what is claimed as new and desired to be secured by Letters Patent is:

1. A distributor for material being pushed through a vertically extending discharge outlet of a material container, said distributor comprising:
   a fingered rotor;
   structure having means attaching the same to the container and supporting said rotor for vertical reciprocation across said outlet exteriorly of the container;
   a prime mover on said structure connected with the rotor for rotating the latter; and
   power means on said structure coupled with said rotor for reciprocating the latter as it rotates.

2. A distributor for material being pushed through a material discharge outlet of a material container, said distributor comprising:
   a fingered rotor;
   structure having means attaching the same to the container and supporting said rotor for vertical reciprocation across said outlet,
   said attaching means shiftably mounting said structure on the container for movement of the rotor toward and away from said outlet;
   a prime mover on said structure connected with the rotor for rotating the latter; and
   power means on said structure coupled with said rotor for reciprocating the latter as it rotates.

3. A distributor for material being pushed through a material discharge outlet of a material container, said distributor comprising:
   a fingered rotor;
   structure having means attaching the same to the container and supporting said rotor for reciprocation across said outlet,
   said structure including track means normally depending from said attaching means,
   said rotor having a carriage supporting the same and reciprocably carried by the track means for movement toward and away from said attaching means;
   a prime mover on said structure connected with the rotor for rotating the latter; and
   power means on said structure coupled with said rotor for reciprocating the latter as it rotates.

4. The invention of claim 2,
   the material discharge outlet being substantially vertical,
   said attaching means including hinge means secured to the structure for pivotally coupling the latter to the container for swinging about a horizontal axis toward and away from said outlet.

5. The invention of claim 4,
   said hinge means being disposed adjacent the upper end of said outlet, said horizontal axis extending across the upper end of said outlet for swinging of the structure in a vertical arc toward and away from the outlet.

6. The invention of claim 3,
   said power means including a system of cables and pulleys secured to said structure and the carriage, and means for selectively drawing and paying out said calbes for moving said carriage to any predetermined position along said track means.

7. The invention of claim 1,
   said rotor comprising a driven shaft mounted for rotation about its longitudinal axis,
   a plurality of fingers radiating from the shaft and secured thereto for rotation therewith,
   a drum surrounding the shaft and having a circumferentially extending clearance slot for each finger respectively,
   means mounting the drum for rotation about an axis in spaced parallelism to said axis of the shaft,
   means coupled with the shaft for rotating the latter, and means engaging the drum for rotating the latter at the same rate as the shaft.

References Cited

UNITED STATES PATENTS

| | | | |
|---|---|---|---|
| 2,633,231 | 3/1953 | Pilcher | 198—211 |
| 2,715,972 | 8/1955 | Grygiel. | |
| 2,989,171 | 6/1961 | Lorenz | 214—17 |
| 3,212,652 | 10/1965 | Roberts | 214—17 |
| 3,319,810 | 5/1967 | Terho | 214—83 |

ROBERT G. SHERIDAN, *Primary Examiner.*

U.S. Cl. X.R.

198—126, 211; 214—83, 520; 239—679